United States Patent [19]

Sweeney, Jr.

[11] Patent Number: 4,571,530
[45] Date of Patent: Feb. 18, 1986

[54] ADAPTIVE PULSING MOTOR CONTROL FOR POSITIONING SYSTEM

[75] Inventor: James S. Sweeney, Jr., Laguna Beach, Calif.

[73] Assignee: Unisen, Inc., Irvine, Calif.

[21] Appl. No.: 576,013

[22] Filed: Feb. 1, 1984

Related U.S. Application Data

[63] Continuation-in-part of Ser. No. 289,922, Aug. 4, 1981, abandoned.

[51] Int. Cl.⁴ .............................................. G05B 11/18
[52] U.S. Cl. ................................... 318/594; 318/341; 318/599; 318/593; 318/601; 364/167
[58] Field of Search ............... 318/594, 599, 341, 601, 318/593; 364/167

[56] References Cited

U.S. PATENT DOCUMENTS

| | | | |
|---|---|---|---|
| 3,411,057 | 12/1968 | Knight et al. | 318/594 |
| 3,458,786 | 7/1969 | Thompson | 318/594 |
| 3,493,827 | 2/1970 | Tinkler | 318/594 |
| 4,258,301 | 3/1981 | Kawa | 318/594 |
| 4,263,537 | 11/1980 | Davis et al. | 318/599 |
| 4,295,082 | 10/1981 | Moto et al. | 318/594 |
| 4,312,033 | 10/1982 | Sweeney | 318/594 |
| 4,353,019 | 10/1982 | Sweeney | 318/594 |

FOREIGN PATENT DOCUMENTS

0089112  6/1982  Japan .................................. 318/599

Primary Examiner—B. Dobeck
Attorney, Agent, or Firm—Thomas J. Plante

[57] ABSTRACT

An adaptive motor pulsing apparatus for a driven element positioning system is disclosed which divides the available time between recurring motor on periods and motor off periods, and which also varies the duty cycle of the motor during successive on periods in order to provide precise positioning control. The final approach uses a "nudging" technique which increases the duty cycle by increments until forward motion of the driven element is detected.

45 Claims, 6 Drawing Figures

ADAPTIVE PULSING MOTOR CONTROL FOR POSITIONING SYSTEM

This application is a contination-in-part of application Ser. No. 289,922, filed Aug. 4, 1981 now abandonded.

BACKGROUND OF THE INVENTION

This invention relates to an adaptive pulsing system for controlling a motor which moves a device to a desired position. The invention is useful wherever precise position control is desired, and is particularly useful if it is required that the final position always be approached from the same direction. This requirement is found in systems for which the position information is derived from measurement of lead screw rotation, since slack in the driving mechanism can lead to an error in measurement.

In Sweeney et al. U.S. Pat. No. 4,312,033, issued Jan. 19, 1982, titled "Digital Motor Control for Positioning System," a control apparatus and method are disclosed which provide a significant advance in solving the problem of unidirectional approach to a destination position. The system of that application uses a method of repeatedly traversing a fraction of the distance remaining to the destination, until the destination is reached. This system has proven itself highly successful, but it has been found that greater accuracy is attainable through a different method, described in Sweeney U.S. Pat. No. 4,353,019, issued Oct. 5, 1982, and titled "Adaptive Pulsing Motor Control for Positioning System."

U.S. Pat. No. 4,353,019 discloses a method of making a terminal approach to a destination by sending to the motor a series of short pulses of varying width. After sending an initial pulse to the motor having a predetermined width (duration), a short delay is observed; and then the position of the driven element is compared to its previous, or "target", position. If the driven element has not been moved past the target position, the motor pulse width is increased by a predetermined increment; and the longer pulse is used to energize the motor. This procedure is repeated, gradually increasing the pulse width, until the driven element moves past the target position. This method has been applied in a digital positioning system for industrial guillotine-type cutters which is installed as a retrofit for older machines. Its adaptive nature allows attainment of exceptional positioning accuracy even on machines with gross mechanical defects.

Although the system just described has proven very effective and accurate, there are advantages to be gained by using the system disclosed in the present application.

The use of a variable duration pulse width, i.e., a variable length delay after turning the motor on, has deficiencies when applied to a multiple-axis control system. Such a system ordinarily is implemented by "time-sharing" the central processor among the axes, which are independently approaching destination positions. If one axis were to appropriate the processor for an indefinite period, while another axis was making a high-speed approach, there would be a substantial likelihood that the latter axis would overshoot its mark. Another conflict could occur if two or more axes were in the final adaptive approach procedure, and if each were to add its pulse-on delay time to the other's pulse-off delay time. The pulse width for each axis could increase without limit, without altering the "duty cycle", i.e., the ratio of "on" time to the total of "on" time plus "off" time. While the system of U.S. Pat. No. 4,359,019 could be redesigned to permit time-sharing, the changes would be complex and costly.

Another deficiency in the system of that application is the constraint on the method of varying pulse width caused by the dual-voltage design of the motor drive circuit, which provides a high DC voltage to the motor for fast travel, and a low DC voltage for slow travel.

Additionally, the control apparatus and method of the present invention has proved to be even more accurate than the prior systems, and to be more rapid in approaching the destination position.

Another benefit of the present system is greater adaptability to the frictional differences which may be encountered in different positions of the driven element. In other words, there is greater certainty that motion will occur at some point during each pulsing cycle.

SUMMARY OF THE INVENTION

The present invention is a synchronous pulsing system, which varies the energy exerted during a limited motor "on" period. In other words, the motor "on" portion of each cycle is a limited "window", or period, of time; and the motor "off" portion of each cycle is also a limited period of time, the two periods having a ratio which is dictated by the type of machine being operated. Within the "on" window, a "nudging" technique is used during final approach to move the driven element by providing initially a lesser amount of energy during the period of one "on" window, and gradually increasing the amount of energy during each successive "on" window, until forward movement is detected. Then the cycle begins again with the lesser amount of energy (which has a value designed to ensure against overshoot).

Thus, the duration of the actuation period ("on" window) is limited to a fraction of each on-plus-off cycle, but the driving energy is varied within the "on" window. This variation preferably is accomplished by varying the duty cycle of the motor. And the preferred way of causing the duty cycle variation is to provide motor driving pulses whose width is varied to alter the ratio of "on" and "off" time within the "on" window. For final destination approach, the motor driving pulses within the window are started at a low duty cycle, and their duty cycle is increased incrementally from "on" window to "on" window until forward motion is detected, after which the sequence is repeated.

Another way of summarizing the inventive concept is to state that means (or a method step) for providing alternating motor-available and motor-unavaliable periods are combined with means (or a method step) for varying the available motor driving energy during the motor-available periods.

In some situations it is useful to vary the length of the motor-available period (or the ratio of the motor-available period to the motor-unavailable period), depending on the magnitude of the distance from current position to destination. In other words, a longer motor-available period might be used until the driven element is within a certain distance from its destination; and then a shorter motor-available period might be used. Such an arrangement can be designed to combine maximum speed of approach with maximum accuracy.

BRIEF DESCRIPTION OF THE DRAWINGS

FIG. 3 is a flow, or logic, diagram which summarizes the operation of the final stage of the positioning system under the control of the microprocessor;

DETAILED DESCRIPTION OF SPECIFIC EMBODIMENTS

Figure 1:
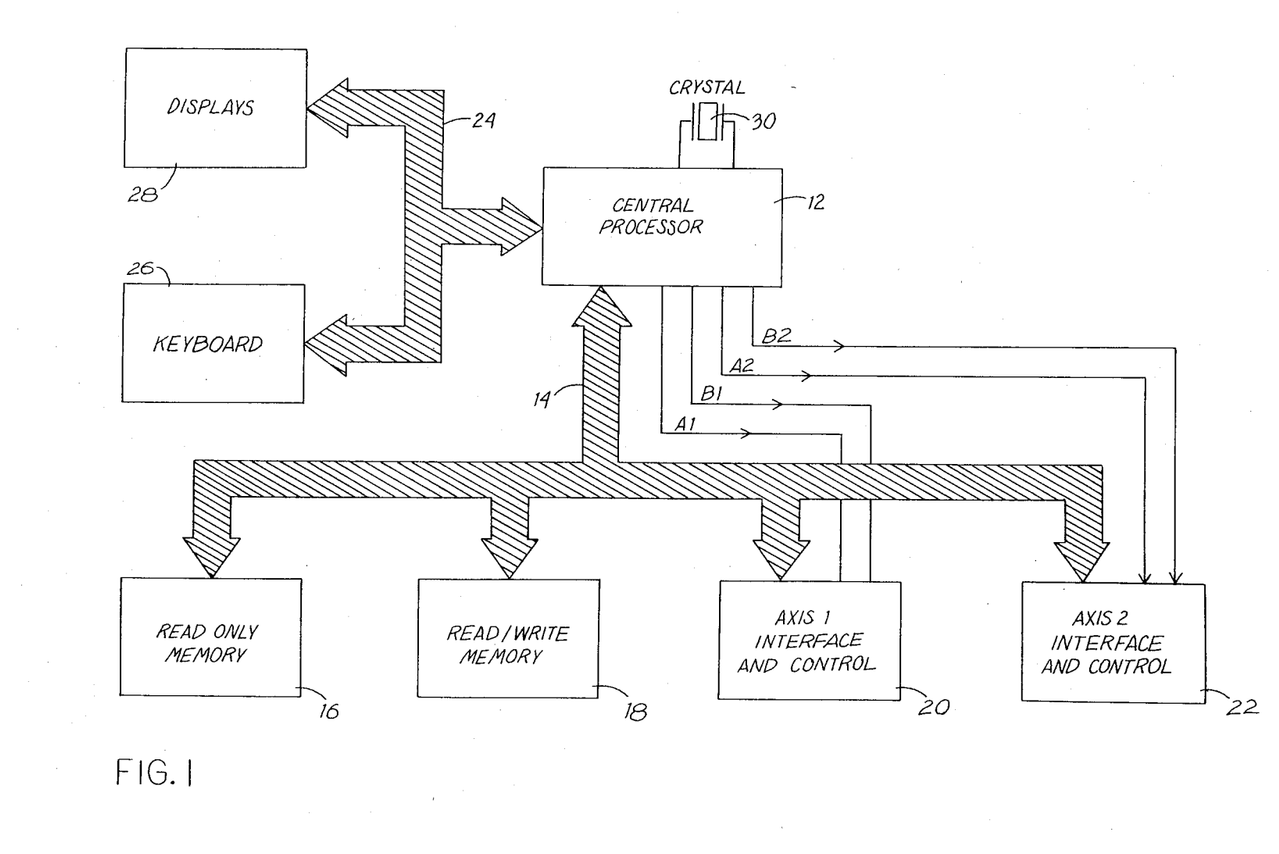
FIG. 1 is a diagrammatic showing of a control system for a multi-axis machine.

FIG. 1 shows the general system, which preferably is microcomputer controlled. A central processor (CPU) 12 is programmed to provide the desired sequencing of events and is in electronic communication, via bus 14 (which includes data, address and control signals), with a read-only (or program) memory 16, a read/write memory 18, an interface/control 20 for the first axis, and an interface/control 22 for the second axis. The CPU 12 also is connected by a bus 24 to a keyboard 26 and to displays 28. The read/write memory stores program variables and sequences of positions; and the keyboard is used for entry of destination positions. The fundamental frequency utilized by the clock of CPU 12 may be established by a crystal 30.

Each axis of the system has a variable duty-cycle circuit which controls motor speed, and two signal inputs which control direction and dynamic braking. In FIG. 1, the two signal inputs from the CPU 12 to the first axis are leads A1 and B1; and the two signal inputs from the CPU 12 to the second axis are leads A2 and B2. The signal inputs from the CPU on these lines establish the ratio of the on window period to the off period during the final approach phase.

Figure 2:
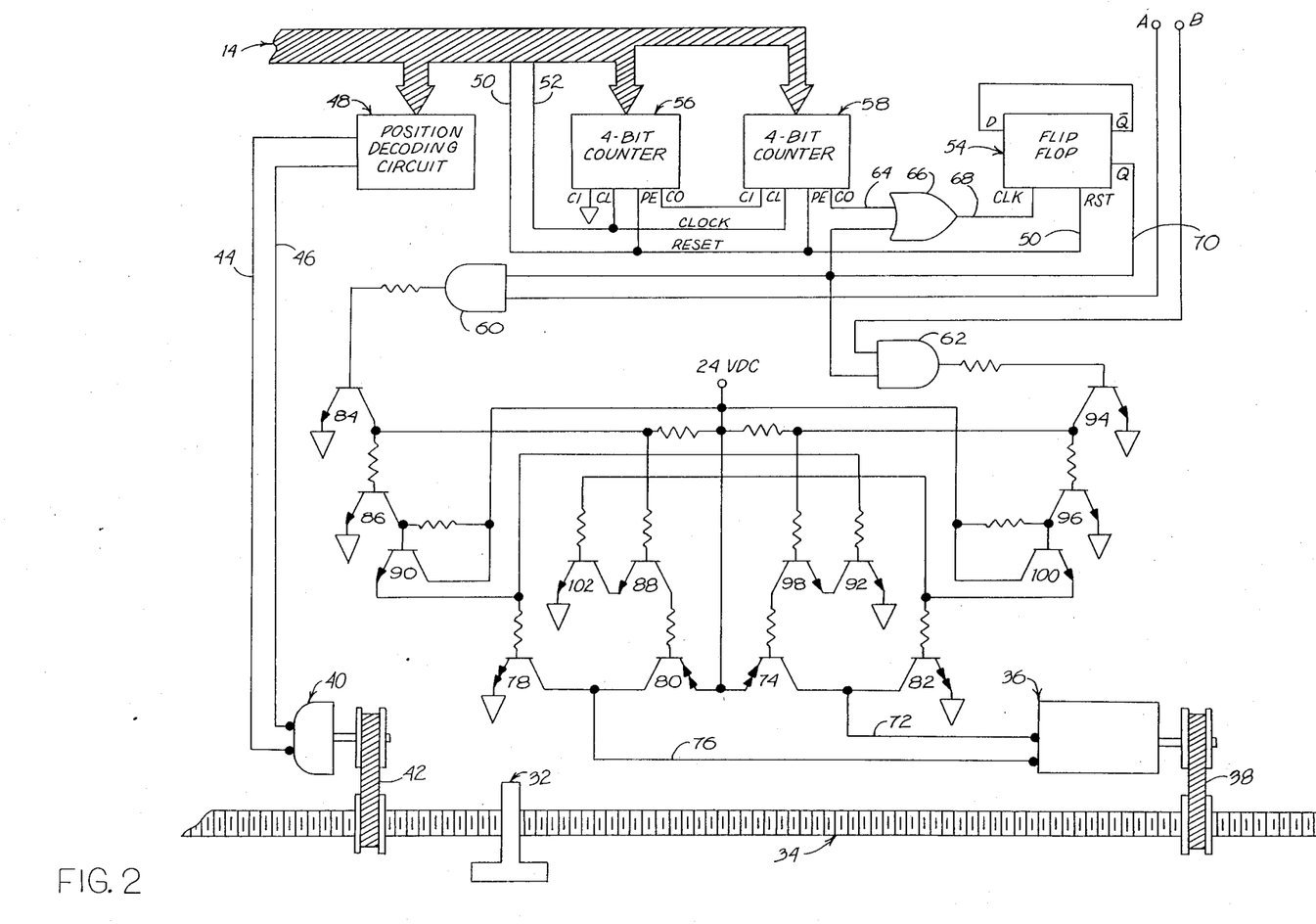
FIG. 2 is a diagrammatic showing of the control circuitry for one axis of the system of FIG. 1.

FIG. 2 provides a diagram of the control circuit for each axis of the system. The end result is controlled motion and precise destination-positioning of a driven element symbolically shown at 32, which may represent any of numerous elements which require precise positioning. Among the intended uses of the present invention are positioning of the lens and film planes of cameras, of the chases of step-and-repeat machines, or of the tables of drilling machines or milling machines. While the present invention is particularly useful in multi-axis systems, it is also applicable to single-axis systems. Although most uses will favor final destination approach, or "settling in", from one direction only, it is entirely practicable to provide final approach from both directions, as is desirable in step-and-repeat machines.

The position of the driven element may be conveniently sensed for feedback to the control electronics by a shaft encoder 40 (preferably an incremental encoder), which may be operatively connected to the lead screw 34 by a gear belt 42. The position signals from the shaft encoder 40 are conveyed by lines 44 and 46 to a position decoding circuit 48, which accumulates a count representing the position of the driven element 32, and which is in communication with CPU 12 via bus 14.

As previously stated, the conceptual basis of the control portion of each axis of the system is a combination of (a) means for providing a time ratio of on time to off time with (b) means for varying the energy during the on time. This energy variation is used in the final stage of the settling-in motion to provide a gradually increasing "nudging" effort which begins its cycle from lower to higher energy after each detected forward motion.

The variation of energy within the period, or "window", of on time may be accomplished in various ways. The preferred approach, which is disclosed in this application, is variation of the duty cycle by varying the pulse widths of on and off pulses during the periods of the successive on windows. (When the on window time remains constant, increasing the on pulse width is accompanied by a decrease of the off pulse width, and vice versa). Instead of duty cycle variation to vary the effective energy during the on window period, the voltage level (amplitude) could be varied from one on window to the next; or both the duty cycle and the amplitude could be varied. But such systems would be more complicated and more difficult to control precisely. Furthermore, other ways of varying the duty cycle within the on window period could be used, such as pulse frequency variation. However, such an arrangement would be less cost-effective, requiring more components than the system disclosed herein.

Figure 6:
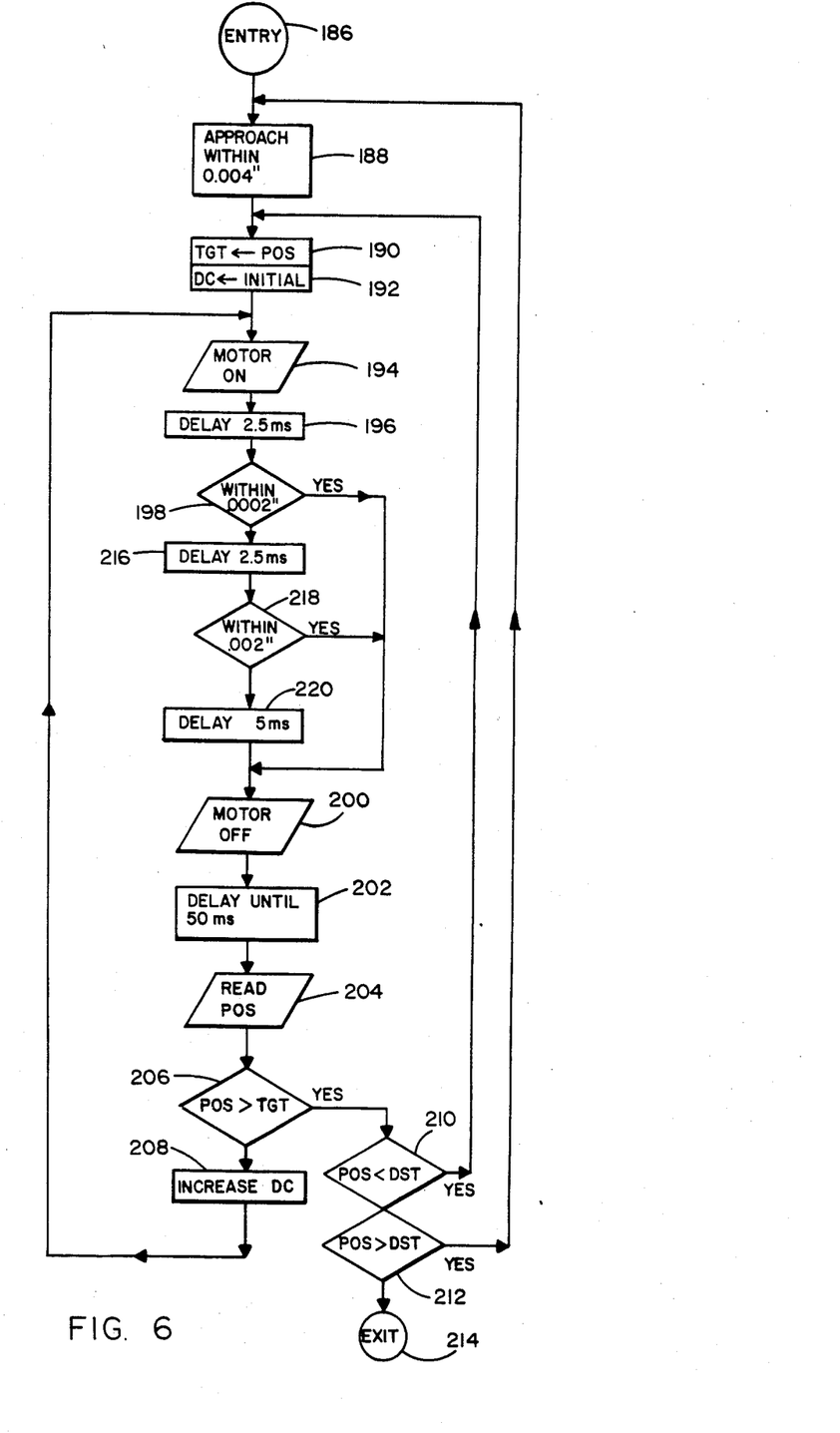
FIG. 6 is a flow diagram in which the system of FIG. 5 is modified to combine the basic system with a plurality of stages in which the length of the motor-available, or "on-window", time is altered as the destination is approached.

A further variation which is sometimes desirable is variation in the length of the on window period. In other words, assuming the total duration of a motor-available period and the next motor-unavailable period is established, it may be useful to provide longer motor-available periods when the destination is farther away, and shorter motor-available periods when the destination is closer. This arrangement, which tends to combine speed and accuracy in reaching the destination, is illustrated in FIG. 6.

Summarizing the preferred embodiment, alternating motor-available periods and motor-unavailable periods are provided. During the motor-available periods, the motor is capable of being turned on, but it may be pulsed to vary its duty cycle. During the motor-unavailable periods, it cannot be turned on. Accomplishing the duty cycle variation by varying the widths of the pulses during the on window periods can be accomplished in other ways than disclosed below, but the following arrangement has operated very satisfactorily.

The control portion of the system includes four control lines from the CPU 12. In addition to the A and B lines, previously mentioned, a reset line 50 and a clock line 52 are required. The reset line 50 is connected to a counter and to a flip-flop 54. The counter is an 8-bit counter provided by combining two 4-bit counters 56 and 58, each communicating with CPU 12 via bus 14. The reset line 50 is connected to the preset enable inputs of each of the counters 56 and 58, and to the reset input of flip-flop 54. The clock line 52 is connected to the clock inputs of each of the counters 56 and 58. The carry in of counter 56 is grounded, and the carry out of counter 56 is connected to the carry in of counter 58.

The direction control lines A and B are connected to AND gates 60 and 62, respectively. The carry out of the 8-bit counter is an input via line 64 to an OR gate 66, whose output is connected by line 68 to the clock input of flip-flop 54. The $\overline{Q}$ output of flip-flop 54 is tied to its Data (D) input. The Q output of flip-flop 54 is an input via line 70 to both AND gates 60 and 62, and also to OR gate 66. The two AND gates 60 and 62 provide controlling signals to the motor 36 through the intermediary of a suitable motor drive circuit, which operates according to the logic of this truth table:

|       | A = 0   | A = 1    |
|-------|---------|----------|
| B = 0 | off     | forward  |
| B = 1 | reverse | braking  |

As shown in FIG. 2, motor 36 will run in the forward direction if 24 V is supplied to lead 72 via Darlington 74, and ground is supplied to lead 76 via Darlington 78. The motor will run in reverse when lead 76 receives 24 V from Darlington 80 and lead 72 is grounded via Darlington 82. Dynamic braking is accomplished if both leads are shorted together to ground via Darlingtons 78 and 82. If all Darlingtons are off, the motor is in an off state.

Transistors 84 through 102 provide the logical interfacing between the AND gates 60 and 62 and the Darlingtons. Consider the case in which A=1, B=0, and the Q output of flip-flop 54 is 1. The output of AND gate 60 is 1, turning on transistor 84, which then turns off transistors 86 and 88. Turning transistor 86 off activates transistor 90, which turns on Darlington 78, providing ground to motor lead 76. Transistor 90 also turns on transistor 92. The output of AND gate 62 is 0, so that transistor 94 is off, causing transistors 96 and 98 to be on, and transistors 100, 102 and Darlington 82 to be off. Since both transistors 92 and 98 are on, Darlington 74 is turned on, supplying 24 V DC to motor lead 72, thereby causing motor 36 to move in the forward direction.

It will be seen from the symmetry of the circuit that, when B=1 and A=0, Darlingtons 80 and 82 will be turned on, and the motor will run in the reverse direction.

The following is a table of transistor states as a function of the states of the A and B lines.

| A = 0  | A = 1  | B = 0   | B = 1   |
|--------|--------|---------|---------|
| 84 off | 84 on  | 94 off  | 94 on   |
| 86 on  | 86 off | 96 on   | 96 off  |
| 88 on  | 88 off | 98 on   | 98 off  |
| 90 off | 90 on  | 100 off | 100 on  |
| 92 off | 92 on  | 102 off | 102 on  |
| 78 off | 78 on  | 82 off  | 82 on   |

Darlington 80 is on if 102 and 88 are on (A=0, B=1); Darlington 74 is on if 92 and 98 are on (A=1, B=0).

Other electronic circuitry may be used in controlling the motion of motor 36, but the disclosed circuitry is particularly simple, cost-effective and rugged for fractional horsepower motors operating in the region of 24 volts.

The circuitry which determines the amount of energy applied during the period of the on window also may be selected from a number of options. The arrangement disclosed is considered relatively cost-effective. In the experimental system, the counters 56 and 58 are CMOS 4-bit presettable binary counters, and the flip-flop 54 is a D-type flip-flop. The purpose of the circuit is to provide a pulse train whose duty cycle is proportional to an 8-bit value provided by the CPU 12. The counter is run in its "up" mode so that, upon counting up to its full count of 255, it generates a carryout pulse on its CO pin and starts counting up again from zero. In the configuration shown in the drawing, the count increments at the clock frequency.

As shown, the $\overline{Q}$ output of flip-flop 54 is tied to the D input so that at each clock transistion the Q output changes state. The gate 66 ORs together the CO output of the counter and the Q output of the flip-flop so that, once the flip-flop has set its Q output to 1, no further transition can occur on its CLK input until after a reset. The clock signal is generated by the computer for various purposes; it is 400 kHz as it leaves the CPU, and is divided down to give the lower frequency. The reset signal is generated once every 256 clock cycles (at half the display referesh rate); it resets the flip-flop and presets the counter to the 8-bit value present on the data bus. The computer sees this as "writing" the value to the counter, as if it were a location in memory.

The A and B signals provide direction and on/off logic. When a signal is present on A or B and while a 1 is present at the Q output of the flip-flop, a 1 will be present at the output of one of the two AND gates, and current will flow through the motor. In establishing the overall relation of on window time to off time of the motor, i.e., the percentage of total time during which the on window permits motor actuating energy to be exerted, the CPU 12 is controlling the true or false signal on either line A or line B to the motor control circuit. If the axis under control is moving in the forward direction, the line on which a true, or positive, signal appears during the on window period is line A.

The sequence of operations is as follows: the RESET signal resets the flip-flop to the off state (Q=0, $\overline{Q}$=1) and presets the counter to the value output from the computer. The counter counts from its preset value to 255, then generates a carry-out pulse, which triggers the flip-flop to its on state (Q=1). If a 1 is present on A (or B), then a 1 will be present at the output of AND gate 60 (or 62), and the motor circuit will operate. If the preset value is 255, the motor will be off during one clock period, after which the flip-flop will be triggered, turning the motor on (assuming A or B is present). The motor remains on for the remaining 255 clock periods and is turned off at the next reset. This gives a 99.6% duty cycle, which is the maximum attainable. If the preset value is 128, the motor is off for 128 clock periods, then on for 128 clock periods—a duty cycle of 50%. At a preset value of 64, the motor is off for 192, on for 64, a 25% duty cycle.

The electronic position control system of FIG. 2 is, as previously stated, for one axis only. Each axis requires its own control system, i.e., an additional motor, lead screw, encoder, position decoding circuit, reset line, motor drive circuit, and direction control lines. The clock signal may be common to all axes. If a multi-axis system is used, the CPU 12 coordinates actuation of the axes, and prevents any conflicting demands from occurring.

The control system described above permits a high degree of flexibility in operating motor 36 to move the driven element 32 to its desired, or destination, position. In general, it has proved desirable to initially cause rapid, continuous movement of the motor and driven element until the latter reaches a position within a certain distance from its destination. Then a fractional distance approach system of the type disclosed in U.S. Pat. No. 4,312,033, which provides relatively rapid motion with minimal overshoot risk, may conveniently be used to control the motor until the driven element is ready for the final approach. The final approach phase, which is capable of extreme accuracy, is provided by the control system disclosed in this application, which is considered an improvement over the final approach phase disclosed in U.S. Pat. No. 4,353,019.

The following description of the overall operation uses illustrative values which have proved successful in experimental situations. Such values may, of course, be varied substantially, as long as they remain within the operational requirements of a given apparatus. If the driven element is beyond the destination, it is driven at high speed in the reverse direction past the destination, and braked to a halt. If it is then far enough from the destination for the fast speed phase to be used without likelihood of an overshoot, the driven element is moved forward at high speed until that condition is no longer true, whereupon it is braked to a very low speed. By reducing the duty cycle, a slower approach speed can easily be provided as an intermediate stage of continuous motion; but this stage has not proved to be necessary in test operations.

The driven element is next driven at a slower speed, using the fractional distance approach system of U.S. Pat. No. 4,312,033, until the terminal neighborhood is reached. In a prototype machine embodying the invention, the terminal neighborhood is a distance of about 0.004 inch.

In the final phase, the position of the driven element is first measured and stored in memory as a target position. If the distance to the final destination is greater than 0.001 inch, an initial duty cycle of 60% is chosen. If the distance is less than 0.001 inch, the initial duty cycle is 40%, which under most circumstances is not quite sufficient to move the driven element in the prototype device. The motor is turned on in the forward direction for five milliseconds, then turned off.

For the rest of a fifty millisecond period, the central processor attends to other tasks, including control of another axis (or axes). then it returns to the pulsing procedure for the axis in question, and checks the current value of the position of the driven element. If this position is forward of the target position, which is the last attained position, the initial value is again used for the next pulse, and the current position becomes the target. If no motion is sensed, the duty cycle is increased by 6.25%, whereas, if the driven element has slipped backwards, an increase of 12.5% is used. This cycle is repeated until forward motion occurs, increasing the energy in increments by increasing the duty cycle during the five millisecond "on" period. If the duty cycle has reached 100% without forward motion, a slipping back may have occurred, and a new target (the attained position) will be selected.

On the prototype installation, which is a two-axis drilling machine, the resolution of the position-sensing circuit is 0.0000625 inch. Using the procedure described above, the computer has been able to position with no detectible error, or overshoot, on at least half of all trials.

In the prototype version, a clock frequency of 100 kHz and a reset frequency of approximately 390 Hz is in use. The reset frequency is 1/256 of the clock frequency. The motors hum at the reset frequency when the duty cycle is below 90%. The initial choice was 1562 Hz, but this was perceived as an unpleasant whine. A new frequency was therefore chosen to provide a more acceptable sound.

Operation will be further clarified by referring to FIGS. 3 and 4. FIG. 3 discloses a logic flow chart used in controlling the experimental apparatus. As shown starting with the entry symbol, the initial logic step in each axis-control sequence is an input/output block 110, which represents a subroutine from which control is returned to the illustrated logic system when an absence of lead screw motion is indicated.

Then, in input-output block 112, control is relinquished from the illustrated logic system to the time-sharing period utilized by the other axes. When control is returned to the illustrated axis, the present position of the driven element is checked. At decision block 114, it is determined whether the driven element has reached its destination position. If the answer is "yes", the normal path is to "exit". However, in some situations, it may be preferred to follow the dashed line back to the top of the chart, which would have the effect of causing the apparatus to maintain its position in spite of any external forces tending to alter its position. Such an automatic position-maintaining loop would not be desirable in an apparatus such as a drilling machine where the effect might be to break the drill if drilling had begun.

If destination has not been reached at decision block 114, it is next determined at decision block 116 whether the driven element is in the final approach, or pulsing zone. If it is not in that zone, an approach procedure will be carried out, as shown by block 118. If the driven element is in the pulsing zone, the next step, as indicated by process block 120, is establishing an interim target position, which is the same as the present position of the driven element. It will be recognized that this procedure is similar to the "nudging" procedure disclosed in U.S. Pat. No. 4,353,019, wherein the final approach exerts the minimum effort required to cause forward motion of the driven element. This procedure prevents overshoot, while permitting small increments of motion which reach the destination position with extreme accuracy.

Decision block 122 again determines whether the driven element is at destination. If it is, the logic flow returns to the top of the chart and reaches "stop" block 110. This permits the system to exit from the pulsing loop which begins with target-setting block 120.

As previously stated, it is possible to utilize the great flexibility of the present control system by providing alternative duty cycle minimums, depending on the remaining distance from the destination. As indicated by decision block 124, if the position is within the outer zone, the duty cycle sequencing will start at 60%, as shown by process block 126. If the position is in the inner zone, the duty cycle sequencing will start at 40%, as shown by process block 128. The 40% duty cycle value, which is both an approximate value and a somewhat arbitrary one, has been chosen to provide an amount of effort slightly below that normally required to cause forward movement of the driven element.

As shown by process block 130, the duty cycle is set at the initial value (either 40% or 60% depending on position), and the motor is turned on at block 132. In accordance with block 134, a fixed delay provides a period, or "window", of on time. This delay is shown as approximately 5 ms, or 10% of the total on-plus-off period of approximately 50 ms, which is the period from one "triggering" to the next. The percentage of on time to total time in each on/off period is chosen to meet the requirements of the apparatus which is being positioned. The duration of the on window, and the duration of the complete on/off period, are preferably set as integer multiples of the reset period, which is 2.56 ms (i.e., the reciprocal of the approximately 390 Hz reset frequency).

After the 5 ms on period, symbolized by block 134, the motor turns off, as shown by block 136. At this point, as shown by block 138, "attention" of the CPU 12 is transferred to the other axis, or axes, of the apparatus. During the off period, the current position of the driven element (on the axis shown in the figure) is repetitively determined.

After the full trigger-to-trigger period (which was selected as 50 ms) has passed, as indicated by decision block 140, the logic flow moves to decision block 142, which determines whether or not the driven element has moved past the target (which, as stated, preferably was set at the actual position reached by the driven element). If the target has been passed, the loop is repeated, beginning with a new target setting at block 120 (the new target being the new position attained by the driven element, forward of its previous position).

If decision block 142 indicates that the driven element has not moved forward from the target position, a determination is made at decision block 144 whether it has slipped back from the target position. Here again, the unusual flexibility of the present control system comes into play because different increments of duty cycle increase may be used, depending on the answer to the question whether the position has slipped back. If the driven element has slipped back, the chart at block 146 shows a 12.5% increase of the duty cycle, which would bring it to 52.5% if it had been 40% during the period of the preceding on window. If the driven element has neither slipped back nor moved forward, the chart at block 148 shows a 6.25% increase of the duty cycle, which would bring it to 46.25% if it had been 40% during the period of the preceding on window, to 52.5% if it had been 46.25% during the period of the preceding on window, and so on.

As shown at process block 150, the next duty cycle percentage is determined by adding the most recent duty cycle value to the increment-of-increase value. The percentages of duty cycle increase are chosen to suit the requirements of the apparatus, selecting binary values from those available in the 8-bit counter. The new, increased duty cycle is then returned through the loop to block 130, where the increased duty cycle is set, after which the motor is turned on again for the same on period, or "window", of 5 ms. When the total period of 50 ms has passed, determination is made at block 142 whether the driven element has moved forward from the target position. If it still has not moved forward, another increment of duty cycle increase (either 6.25% or 12.5%) is added at block 150, and the motor triggering is repeated.

Block 152 indicates that different strategies need to be adopted if the duty cycle reaches 100% without moving the driven element forward of the target position. One possibility is to reset the target at the then current position, as indicated by the solid line looping back to block 120. Another possibility is to get out of the pulsing loop, as indicated by the dashed line looping back to block 110.

Figure 4A:
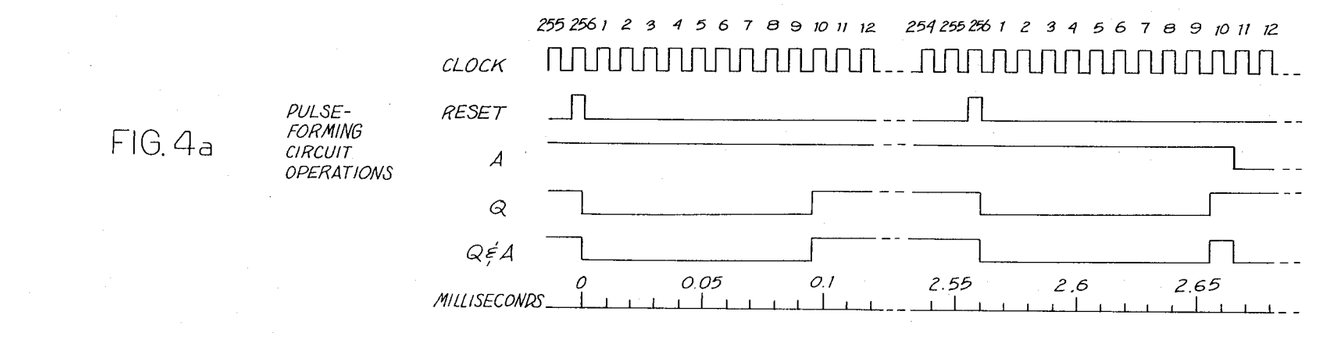
FIG. 4 is a pulse diagram showing the sequence and duration of driving pulses in the system.
Figure 4B:
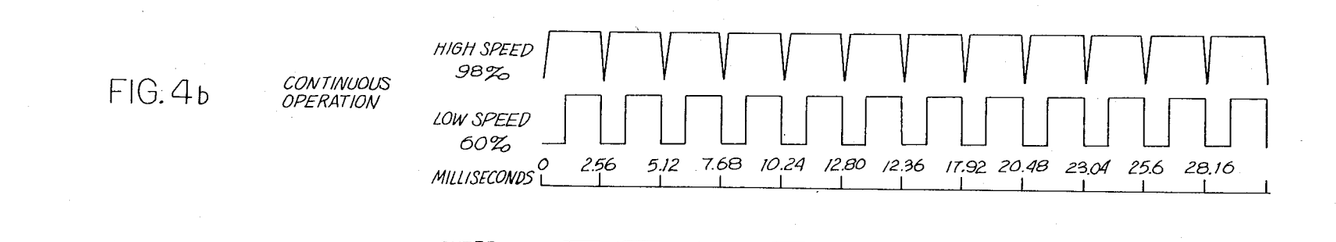
Figure 4C:
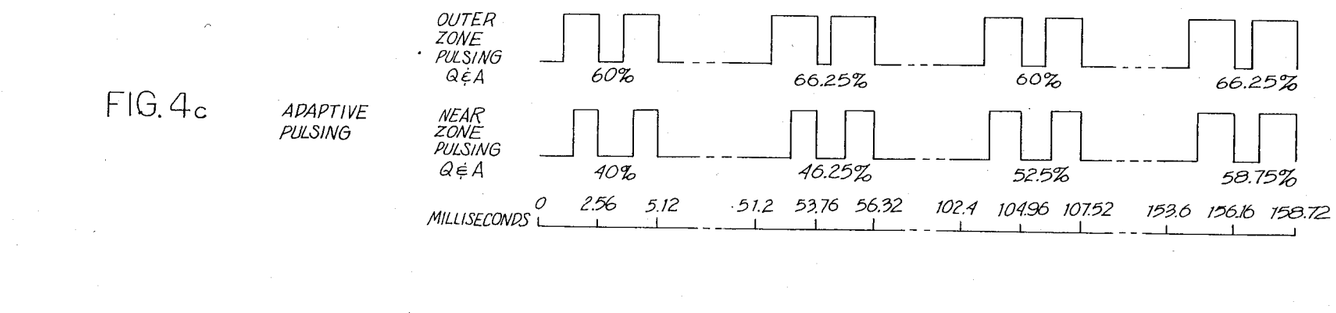

FIGS. 4A, 4B and 4C provide additional clarification by diagramming the motor driving pulses created by the pulse forming circuit. Each of the three pulse diagrams is scaled on a time, or duration, basis; but the three scales are widely different in magnitude.

FIG. 4A shows the timing of signals received at AND gate 60. The clock pulses count to 256, as shown on the first line. The reset pulse at flip-flop 54 coincides with the 256th clock pulse, as shown on the second line. The pulses on line A (which create the on windows in the forward direction) and the pulses at Q of flip-flop 54 both appear at AND gate 60. The period during which the signal on line A is positive depends on the on window duration, which varies from 100% during continuous operation of the motor to whatever value is selected as the desired on-to-off ratio during the adaptive pulsing mode used for final approach. The third line in FIG. 4A shows an arbitrarily selected pulse length on line A; and the fourth line shows an example of the pulse width at the Q output of the flip-flop. The example chosen is a high duty cycle value, approximately 96%, because Q, in the illustration, remains positive from the 10th clock pulse to the 256th clock pulse. As previously explained, the duty cycle is varied by changing the number of the clock pulse cycle on which preset occurs, thereby changing the point at which Q output goes from negative to positive. If Q is caused to go from negative to positive at the 128th clock pulse, the duty cycle of the motor during each on window period (while that preset value continues) will be 50%.

The last line on FIG. 4A shows the output pulses of AND gate 60. Driving energy to the motor is supplied during the positive pulses which occur when, and only when, both Q and A are positive. The short positive pulse near the right end of the line indicates that line A has gone negative, which would occur at the end of the continuous motion phase of motor operation, after which the next phase of the settling-in motion is initiated.

FIG. 4B shows sample pulse trains during continuous operation of the motor. If maximum speed is desired, the driving pulses shown on the first line are used, providing approximately 98% of available motor energy. If a somewhat lower-speed, but continuous, motor energization is desired, a lower duty cycle may be used, such as the approximately 60% duty cycle shown on the second line. The millisecond scale of FIG. 4B shows that the duty cycle is identical in each time segment of 2.56 ms. As shown in FIGS. 4B and 4C, the on window, or motor-available, duration, which in this embodiment is 5.12 ms, is twice the duration of the reset period, thus allowing two driving pulses in each motor-available period. The number of reset periods in each motor-available period could be reduced to one, or increased to an integer multiple of the reset period (i.e., 3×2.56=7.68 ms, 4×2.56=10.24 ms, etc.). This relationship is preferred, in order to provide reproducible results in resolution performance of the system. The motor-unavailable periods also will be integer multiples of the reset periods.

A major benefit of the present invention is illustrated in FIG. 4C, which shows how the adaptive pulsing concept works in the final approach. Generally, it is preferred to have different duty cycle values in an outer zone and an inner zone, although this refinement is not necessary. For example, the outer pulsing zone may cover the distance between 0.004 inch and 0.001 inch from destination. And the inner, or near, pulsing zone may cover the final 0.001 inch. (The adaptive pulsing entry at 0.004 inch has been used because it is convenient to use the faster approach mode shown in U.S. Pat. No. 4,312,033 to bring the driven element to this point, without any danger of overshoot).

The first line of FIG. 4C shows a 60% duty cycle used for adaptive pulsing in the outer zone. The on window period has been selected as 10% of the total on/off period, or cycle. This value can be changed, but is has been very successful in experimental apparatus. Obviously, the on time percentage must be low enough not to interfere with the timesharing requirements of other axes. As seen from the time scale in FIG. 4C, the on window is 5.12 ms, and the total period, or cycle, is 51.2 ms, the motor being unable to receive electrical energy during 90% of the cycle.

The first effort to move the driven element forward in the outer zone receives a 60% duty cycle. If forward motion does not occur, the next duty cycle, as shown, is 66.25%. If forward motion does occur as a result of this second "nudge", the duty cycle reverts back to 60%, as shown.

Within the near zone, a first duty cycle "nudge" of 40% is usually found to be desirable. This is preferably chosen as a value which will ordinarily not cause forward motion to occur. Until such motion does occur, each successive on window will, as shown, receive a duty cycle which is higher than the previous one by an increment of 6.25%. So the duty cycle will rise, in each successive on window, from 40% to 46.25% to 52.5%, and so on until forward movement occurs.

In the FIG. 3 flow chart, certain differences in position and motion of the driven element call for variations in either the "starting" duty cycle in a series of motor-available periods, or the increment of increase in the duty cycle from one motor-available period to the next. For example, blocks 124, 126 and 128 start the duty cycle at different percentage values, depending on whether the driven element is in an "outer zone" (farther from destination) or an "inner zone" (closer to destination). A higher starting duty cycle (for a series of pulses) is used if the driven element is still in the outer zone. Also, blocks 144, 146 and 148 vary the increment of duty cycle increase from one motor-available period to the next. A higher increment of increase is provided if the driven element has slipped back than if it has remained stationary.

Figure 5:
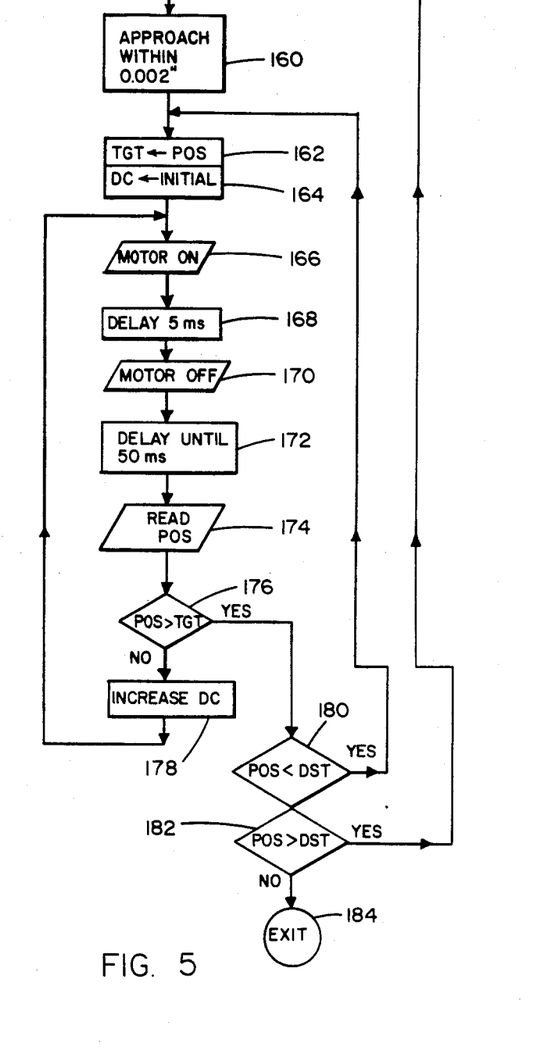
FIG. 5 is a flow diagram which shows a simplified, or basic, version of the flow diagram in FIG. 3.

FIG. 5 shows a simplified flow chart, which dispenses with the embellishments discussed in the preceding paragraph. In many situations the system of FIG. 5 is satisfactory, particularly when the concepts disclosed in Sweeney Application Ser. No. 439,299, filed Nov. 4, 1982, are incorporated. In FIG. 5, block 160 represents the procedures which bring the driven element within 0.002 inch of its destination. This is followed by block 162, which assigns to the variable "target" the value of the variable "position". The next block 164 sets the initial duty cycle, or driving energy, for the new series of motor-available periods.

Input/output block 166 provides for turning on the motor. After a delay of approximately 5 ms, as shown by process block 168, the motor is turned off (block 170). Process block 172 indicates a total on-plus-off period of approximately 50 ms. At block 174, the current position is checked. If current position is not greater than target, as determined at decision block 176, there is an incremental increase in the duty cycle (block 178), and the loop returns to process block 166. The motor is again turned on, and has a higher duty cycle during the 5 ms motor-available period. This process continues, with incremental duty cycle increases, until decision block 176 indicates that current position has passed the interim target.

At this juncture, decision block 180 determines whether current position is less than destination. If the answer is "yes", the loop returns to blocks 162 and 164, where a new interim target is set, and the duty cycle is returned to its initial value. If the answer at block 180 is "no", then decision block 182 determines whether the driven element has overshot the destination, in which event the approach procedure is repeated. If it has not overshot, the chart shows "exit" symbol 184, because destination has been attained.

FIG. 6 adds to FIG. 5 certain steps which vary the duration of the motor-available periods. As the driven element moves within predetermined distances from destination, the motor-available time is automatically reduced.

From entry symbol 186 in FIG. 6, the flow chart leads to process block 188, which symbolizes the entire approach procedure until the driven element is within 0.004 inch of its destination. Next, at process blocks 190 and 192, the variable target is set as the variable position, and the duty cycle is set at its initial value. At block 194, the motor is turned on. After a delay of approximately 2.5 ms, as indicated by block 196, decision block 198 determines whether the driven element is within the innermost zone, i.e., within 0.0002 inch of its destination. If the answer is "yes", the chart flows directly to block 200, where the motor is turned off. As in FIG. 5, motor turn-off is followed by a delay at block 202 until the total on-plus-off period of approximately 50 ms has been completed. Then position is read at block 204; and decision block 206 directs the process flow either to block 208 for a duty cycle increase, or to decision block 210 to determine whether another loop, starting at blocks 190 and 192, is required. If not, decision block 212 determines whether overshoot has occurred, or whether the position-finding process can end, as symbolized by exit 214.

If decision block 198 indicates that the driven element is not within 0.0002 inch of its destination, process block 216 causes the motor to remain turned on for an additional time of approximately 2.5 ms. Then decision block 218 determines whether the driven element is within 0.002 inch of its destination. If the answer is "yes", the process flows directly to block 200, where the motor is turned off.

If decision block 218 indicates that the driven element is not within 0.002 inch of its destination, the process flows to process block 220, which causes the motor to remain turned on for an additional time of approximately 5 ms.

Thus, depending on the zone of distance-from-destination which the driven element has reached, it is possible to vary the duration of the motor-available period. Since a longer motor-available period is provided when the driven element is farther from the destination, a faster approach is possible. Since a shorter motor-available period is provided when the driven element is closer to the destination, a more accurate resolution without overshoot is possible.

It will be noted that the on window, or motor-available, periods in the system of FIG. 6 are all integer multiples of the reset period. In the zone nearest the destination (within 0.0002 inch), only one driving pulse occurs in each reset period. In the next zone (within 0.002 inch), two driving pulses occur in each reset period. And in the third zone (within 0.004 inch), four driving pulses occur in each reset period. In other words, the frequencies of on window periods may be synchronized with the clock-determined periods, so that the desired number of pulses occurs during each on window period.

The system of FIG. 6 permits combining automatic variations of energy during the motor-available periods with automatic variations in the duration of the motor-available periods. An additional increment of controllability could be provided by combining amplitude variations of the driving pulses with variations in their duration.

As will be readily understood, this very "careful" procedure, which involves the use of only enough energy to cause detectible forward motion, will provide extremely accurate positioning of the driven element.

The following claims are intended not only to cover the specific embodiments disclosed, but also to cover the inventive concepts explained herein with the maximum breadth and comprehensiveness permitted by the prior art.

What is claimed is:

1. A destination-finding control system for a direct current motor which moves a driven element, comprising:
   means for establishing a destination for the driven element;
   means for controlling the approach of the driven element to the destination including:
   (a) means for providing a series of timed, alternating motor-available and motor-unavailable periods which alternate continuously until the destination is reached, the motor being capable of receiving driving energy only during the motor-available periods; and
   (b) means for varying the amount of driving energy received by the motor during separate motor-available periods, while maintaining the same interval between the starting times of successive motor-available periods.

2. The destination-finding control system of claim 1 wherein the means for varying the amount of driving energy received by the motor during the motor-available periods is an on-off motor energizing means which varies the energy by varying the duty cycle of the motor.

3. The destination-finding control system of claim 2 wherein the approach to the destination is controlled by means which cause the duty cycle of the motor to increase in successive increments until forward motion of the driven element occurs.

4. The destination-finding control system of claim 1 which also comprises:
   means for varying the lengths of the motor-available periods.

5. In a positioning system apparatus for moving a driven element precisely to a destination, in combination with a motor which moves the driven element in response to sequential on-off driving signals, and which is capable of exerting variable amounts of moving effort on the driven element depending on the duration of the driving signals, a motor-effort-varying apparatus comprising:
   means for providing an on window period which is a substantially constant percentage of the total on-plus-off period of each motor driving cycle, the motor being unable to receive driving effort during the off period; and
   means for varying the amount of motor driving effort received by the motor during each on window period.

6. The apparatus of claim 5 which also comprises:
   means for measuring the position of the driven element and indicating its distance from its destination.

7. The apparatus of claim 6 which also comprises:
   means for moving the driven element to the neighborhood of its destination with a continuous on window period of the motor driving cycle.

8. The apparatus of claim 5 wherein the means for varying the amount of motor driving effort during each on window period causes such variation by changing the duty cycle of the motor.

9. The apparatus of claim 8 wherein the destination-finding portion of the apparatus comprises:
   means for setting a target before each on window period;
   means for establishing a first lower duty cycle value operative during the next on window period;
   means for determining whether motion past the target has occurred after such on window period;
   means for raising the duty cycle value of the next on window period by a given increment after an on window period when such motion has not occurred; and
   means for returning the value of the duty cycle period to its first lower value after an on window period when such motion has occurred.

10. The apparatus of claim 9 which also includes:
    means for automatically causing the duty cycle value operating during the next on window period to be a smaller value if the driven element is in an inner zone nearest the destination or a larger value if the driven element is in an outer zone beyond the inner zone.

11. The apparatus of claim 9 which also includes:
    means for automatically raising each duty cycle value by a greater increment if the driven element has slipped back than the increment of increase if it has remained stationary.

12. For use with a positioning system for moving a driven element precisely to a destination, which has a motor to move the driven element in response to driving pulses and which is capable of exerting variable amounts of moving effort on the driven element depending on the duration of the driving pulses, that method of controlling movement of the motor which comprises:
    measuring substantially continuously the position of the driven element and its distance from the destination;
    causing the motor to move the driven element to the neighborhood of the destination relatively quickly by exerting larger amounts of moving effort thereon;
    establishing a ratio of on window period to off period once the driven element has reached the neighborhood of the destination;
    providing a first lower amount of moving effort during the first on window period;
    determining whether said effort has moved the driven element toward the destination;
    providing increasing amounts of moving effort during successive on window periods, each having an incrementally higher value than the previous one, until the driven element has moved toward the destination; and
    beginning another sequence starting with the first lower amount of moving effort during the next on window period after each measured movement of the driven element toward the destination.

13. The method of claim 12 wherein the amount of moving effort is varied by changing the duty cycle of the motor.

14. The method of claim 13 wherein the ratio of the on window period to the off period is no greater than 1:1.

15. The method of claim 12 which also includes the following steps:
when the driven element has reached the neighborhood of the destination, determining whether it is in an inner zone or an outer zone with respect to the destination; and
providing a lesser first amount of moving effort during the first on window period if the driven element is in the inner zone or a greater amount if the driven element is in the outer zone.

16. The method of claim 13 which also includes the following steps:
when the driven element has reached the neighborhood of the destination, determining whether it is in an inner zone or an outer zone with respect to the destination; and
providing a lesser first amount of moving effort during the first on window period if the driven element is in the inner zone or a greater amount if the driven element is in the outer zone.

17. The method of claim 12 which also includes the following steps:
determining whether the driven element, if it has not been moved toward the destination during the preceding on window period, has slipped back; and
providing a greater increment of increase in the amount of moving effort during the next on window period if the driven element has slipped back than if it has remained stationary.

18. The method of claim 13 which also includes the following steps:
determining whether the driven element, it if has not been moved toward the destination during the preceding on window period, has slipped back; and
providing a greater increment of increase in the amount of moving effort during the next on window period if the driven element has slipped back than if it has remained stationary.

19. In a positioning system for moving a driven element precisely to a destination in response to command signal pulses, in combination with (a) a direct current motor which exerts moving force on the driven element whenever the motor is on, and which is on when the command signal is present and off when the command signal is absent; and (b) means for measuring the position of the driven element and comparing it to the destination:
means for setting an interim target position of the driven element once the vicinity of the destination has been reached;
means for applying to the motor a first series of command signal pulses providing a given amount of driving energy;
means for determining whether said series of pulses has caused the driven element to move sufficiently to cancel the interim target position;
means for applying to the motor successive series of command signal pulses in a cycle, each series of pulses having a slightly higher amount of driving energy than the previous series of pulses, until the driven element has moved sufficiently to cancel the interim target position;
means for setting a new interim target position upon cancellation of the previous interim target position; and
means for beginning a new cycle after each setting of a new interim position until the destination has been reached.

20. The positioning system combination of claim 19 in which the amount of driving energy applied to the motor during each series of command signal pulses is varied by varying the duty cycle of the motor.

21. The positioning system combination of claim 20 which also comprises:
means for establishing a predetermined time from the beginning of one series of command signal pulses to the beginning of the next series of command signal pulses.

22. The positioning system combination of claim 21 which also comprises:
means for providing a predetermined on window time during which each series of command signal pulses is applied to the motor, and a predetermined time between successive series of pulses during which no command signal pulses are applied to the motor.

23. The positioning system combination of claim 19 wherein each cycle begins with a series of pulses providing the same amount of driving energy.

24. The positioning system combination of claim 20 wherein each cycle begins with a series of pulses providing the same amount of driving energy.

25. The positioning system combination of claim 19 wherein each series of pulses in a cycle differs in its amount of driving energy from the driving energy of the previous series of pulses in that cycle by the same increment of increase.

26. The positioning system combination of claim 20 wherein each series of pulses in a cycle differs in its amount of driving energy from the driving energy of the previous series of pulses in that cycle by the same increment of increase.

27. For use with a positioning system for moving a driven element precisely to a destination in response to command signal pulses, which system includes (a) a direct current motor which exerts moving force on the driven element whenever the motor is on, and which is on when the command signal is present and off when the command signal is absent; and (b) means for measuring the position of the driven element and comparing it to the destination; that method of controlling the motor which comprises the following steps:
setting an interim target position of the driven element once the vicinity of the destination has been reached;
applying to the motor a first series of command signal pulses providing a given amount of driving energy;
determining whether said series of pulses has caused the driven element to move sufficiently to cancel the interim target position;
applying to the motor successive series of command signal pulses in a cycle, each series of pulses having a slightly higher amount of driving energy than the previous series of pulses, until the driven element has moved sufficiently to cancel the interim target position;
setting a new interim target position upon cancellation of the previous interim target position; and beginning a new cycle after each setting of a new interim position until the destination has been reached.

28. The motor controlling method of claim 27 in which the amount of driving energy applied to the motor during each series of command signal pulses is varied by varying the duty cycle of the motor.

29. The motor controlling method of claim 28 which also comprises:
establishing a predetermined time from the beginning of one series of command signal pulses to the beginning of the next series of command signal pulses.

30. The motor controlling method of claim 29 which also comprises:
providing a predetermined on window time during which each series of command signal pulses is applied to the motor, and a predetermined time between successive series of pulses during which no command signal pulses are applied to the motor.

31. The motor controlling method of claim 27 wherein each cycle begins with a series a pulses providing the same amount of driving energy.

32. The motor controlling method of claim 28 wherein each cycle begins with a series of pulses providing the same amount of driving energy.

33. The motor controlling method of claim 27 wherein each series of pulses in a cycle differs in its amount of driving energy from the driving energy of the previous series of pulses in that cycle by the same increment of increase.

34. The motor controlling method of claim 28 wherein each series of pulses in a cycle differs in its amount of driving energy from the driving energy of the previous series of pulses in that cycle by the same increment of increase.

35. In a positioning system for moving a driven element precisely to a destination in response to command signal pulses, in combination with (a) a direct current motor which exerts moving force on the driven element whenever the motor is on, and which is on when the command signal is present and off when the command signal is absent; and (b) means for measuring the position of the driven element and comparing it to the destination:
means for providing a series of timed, alternating motor-available and motor-unavailable periods which alternate continuously until the destination is reached, the motor being capable of receiving driving energy only during the motor-available periods;
means for establishing an on-off pulsing sequence which, during the motor-available periods, provides driving energy to the motor only during the on pulses; and
means for varing the amount of driving energy received by the motor during separate motor-available periods.

36. The position system combination of claim 35 which also comprises:
means for varying the duration of separate motor-available periods.

37. The positioning system combination of claim 36 wherein the duration of separate motor-available periods is responsive to the distance from the destination.

38. The positioning system combination of claim 37 wherein the length of the motor-available periods is automatically reduced when the driven element moves within a given distance from the destination.

39. The positioning system combination of claim 38 wherein the amount of driving energy received by the motor during separate motor-available periods is varied by varying the duty cycle of the motor.

40. The positioning system combination of claim 39 wherein the command signal pulses have a clock-determined frequency, and the motor-available periods are integer multiples of the command pulse frequency, thereby permitting synchronization of the motor-available periods with the clock-determined frequency.

41. For use with a positioning system for moving a driven element precisely to a destination in response to command signal pulses, which system includes (a) a direct current motor which exerts moving force on the driven element whenever the motor is on, and which is on when the command signal is present and off when the command signal is absent; and (b) means for measuring the position of the driven element and comparing it to the destination; that method of controlling the motor which comprises the following steps:
providing a series of timed, alternating motor-available and motor-unavailable periods which alternate continuously until the destination is reached, the motor being capable of receiving driving energy only during the motor-available periods; and
varying the amount of driving energy received by the motor during separate motor-available periods, while maintaining the same interval between the starting times of successive motor-available periods.

42. The motor-controlling method of claim 41 which also comprises:
varying the duration of separate motor-available periods.

43. The motor-controlling method of claim 42 wherein the duration of separate motor-available periods is responsive to the distance from the destination.

44. The motor-controlling method of claim 43 wherein the length of the motor-available periods is automatically reduced when the driven element moves within a given distance from the destination.

45. The motor-controlling method of claim 44 wherein the amount of driving energy received by the motor during separate motor-available periods is varied by varying the duty cycle of the motor.

* * * * *